(12) United States Patent
Noller et al.

(10) Patent No.: US 6,702,253 B2
(45) Date of Patent: *Mar. 9, 2004

(54) METHOD FOR PRODUCING A MAGNETIC COIL FOR A VALVE AND VALVE WITH A MAGNETIC COIL

(75) Inventors: Klaus Noller, Oppenweiler (DE); Dieter Maier, Gerlingen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,110

(22) PCT Filed: Apr. 24, 1998

(86) PCT No.: PCT/DE98/01142

§ 371 (c)(1),
(2), (4) Date: Feb. 24, 1999

(87) PCT Pub. No.: WO99/00804

PCT Pub. Date: Jan. 7, 1999

(65) Prior Publication Data

US 2003/0189183 A1 Oct. 9, 2003

(30) Foreign Application Priority Data

Jun. 27, 1997 (DE) .......................... 197 27 414

(51) Int. Cl.7 ............. F16K 31/02; H01F 7/06

(52) U.S. Cl. ............. 251/129.21; 251/129.15; 29/605

(58) Field of Search .......... 251/129.15, 129.21; 29/605; 335/261, 279, 281

(56) References Cited

U.S. PATENT DOCUMENTS

| | | | |
|---|---|---|---|
| 3,669,380 A | * | 6/1972 | Caltagirone ............ 242/158 R |
| 3,861,644 A | * | 1/1975 | Knape ..................... 251/129 |
| 4,610,080 A | | 9/1986 | Hensley |
| 5,450,876 A | * | 9/1995 | Reinicke ............... 251/129.16 |
| 5,477,203 A | * | 12/1995 | Sawazaki et al. ............ 336/92 |
| 5,497,096 A | * | 3/1996 | Banting ..................... 324/555 |
| 5,509,439 A | * | 4/1996 | Tantardini ............ 251/129.08 |
| 5,533,707 A | * | 7/1996 | Beesley ................ 251/129.15 |
| 5,572,788 A | * | 11/1996 | Saitoh et al. ................. 29/606 |
| 5,607,532 A | * | 3/1997 | LoStracco ................... 156/169 |
| 5,723,789 A | * | 3/1998 | Shannon ................. 73/514.31 |
| 5,741,558 A | * | 4/1998 | Otani et al. ................. 427/469 |
| 5,878,522 A | * | 3/1999 | Thedford ......................... 43/1 |
| 5,924,440 A | * | 7/1999 | Doi et al. ..................... 137/270 |
| 5,927,613 A | * | 7/1999 | Koyanagi et al. ......... 239/585.1 |
| 5,937,076 A | * | 8/1999 | Tanabe et al. ............... 381/409 |
| 6,033,189 A | * | 3/2000 | Miura et al. ............. 417/222.2 |
| 6,124,775 A | * | 9/2000 | Linkner, Jr. ................. 335/278 |

FOREIGN PATENT DOCUMENTS

| | | |
|---|---|---|
| DE | 29 514 315 | 12/1995 |
| EP | 140 290 | 5/1985 |
| EP | 513 037 | 11/1992 |
| FR | 2 303 360 | 10/1976 |
| GB | 2 212 982 | 8/1989 |
| JP | 56 048 122 | 5/1981 |

* cited by examiner

Primary Examiner—Kevin Shaver
Assistant Examiner—David A Bonderer
(74) Attorney, Agent, or Firm—Kenyon & Kenyon

(57) ABSTRACT

A method is described for manufacturing a magnet coil for a valve in which first a metal base element of the valve is made available, then an electrically insulating winding support is mounted on the outer wall of the base element, and lastly a winding of the magnet coil is introduced into the winding support. Such a configuration of a magnet coil is suitable particularly in fuel injection valves which are used in mixture-compressing, spark-ignited internal combustion engines, but also in all other solenoid valves.

7 Claims, 3 Drawing Sheets

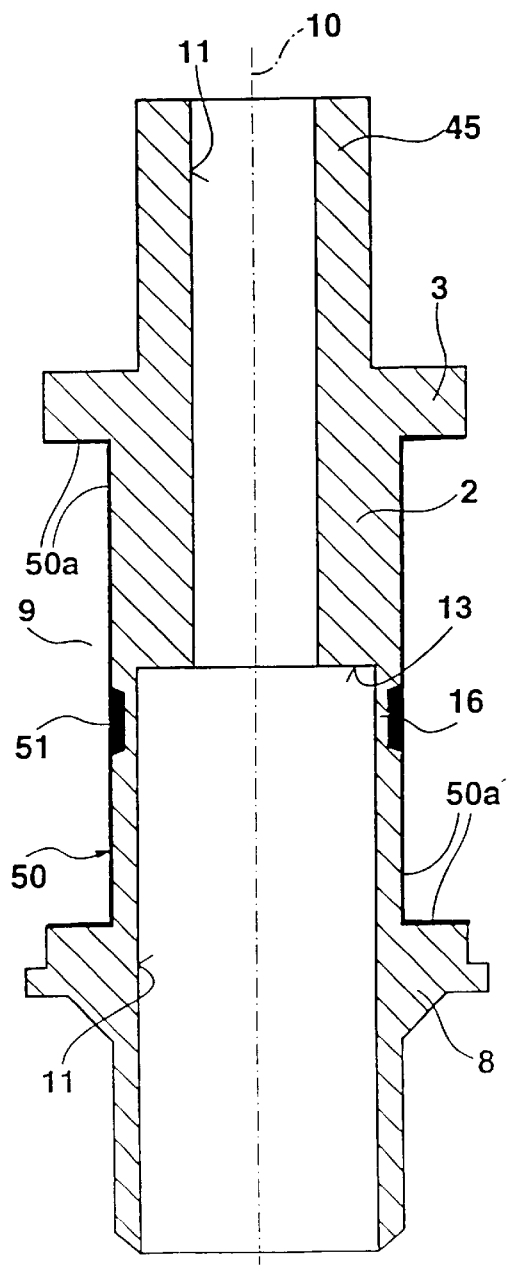
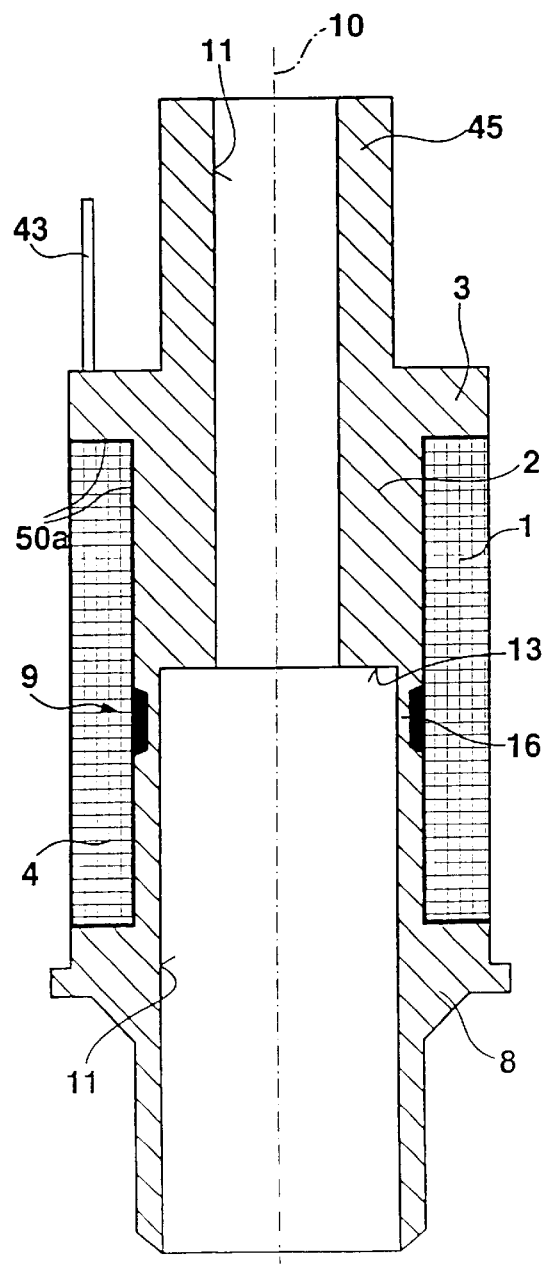
Fig. 2a
Fig. 2b

US 6,702,253 B2

METHOD FOR PRODUCING A MAGNETIC COIL FOR A VALVE AND VALVE WITH A MAGNETIC COIL

FIELD OF THE INVENTION

The invention relates to a method for manufacturing a magnet coil for a valve. In addition, the present invention relates to a valve including a magnet coil.

BACKGROUND INFORMATION

U.S. Pat. No. 4,610,080 describes an U.S. Pat. No. 4,610,080 has already disclosed an electromagnetically actuatable valve which has an electromagnetic circuit comprising inter alia a magnet coil, the energization of which allows a valve member to be actuated to open or close the valve. The magnet coil is configured in such a way that a coil body made of plastic, constituting a supporting and protective element, receives a wrapping which is executed with known coil wire. The prefabricated assembly of coil body and wrapping is mounted in the valve in such a way that an inner valve tube serving as the internal pole engages into the inner opening of the coil body, so that the magnet coil fits completely around the internal pole in the circumferential direction. The coil body is attached onto the inner valve tube with the aid of sealing rings.

European Patent No. 513,037, Great Britain Patent Application No. 2,212,982 and German Patent Application No. 295 14 315 describe a prefabrication procedure of magnet-coil subassemblies for electromagnetically actuatable valves which have a valve body and an embedded wrapping. These prefabricated subassemblies are mounted on an inner valve component of the magnetic circuit in consistently similar fashion.

SUMMARY OF THE INVENTION

The method according to the present invention for manufacturing a magnet coil for a valve, has the advantage that valves with smaller dimensions and a compact design can easily be manufactured. Advantageously, direct attachment of a winding support onto an inner base element (inner valve tube, internal pole) of the valve saves installation space, since the radial wall thicknesses of the winding support can be made very thin. Overall, therefore, valves with smaller outside diameters can be achieved. A separate assembly device for mounting the coil wire on a coil body to form an independent subassembly can be omitted, since the winding can be introduced into the winding support already provided on the base element, thus achieving a cost reduction.

Advantageously, annular coil spaces are created directly on the base element or on the injected-on winding support, and have axial winding delimiters which prevent axial spreading or slippage of the winding.

The valve according to the present invention, has the advantage of a very small and compact design, so that a reduced installation space is required when such a valve is used, for example in an internal combustion engine. The thin-walled configuration of the winding support allows materials to be economized. The decrease in the dimensions of the valve is also accompanied by a reduction in mass.

BRIEF DESCRIPTION OF THE DRAWINGS

FIG. 2a shows a first example for mounting a magnet coil on an internal valve component.

FIG. 2b shows a further view of the first example for mounting the magnet coil on the internal valve component.

DETAILED DESCRIPTION

Figure 1:
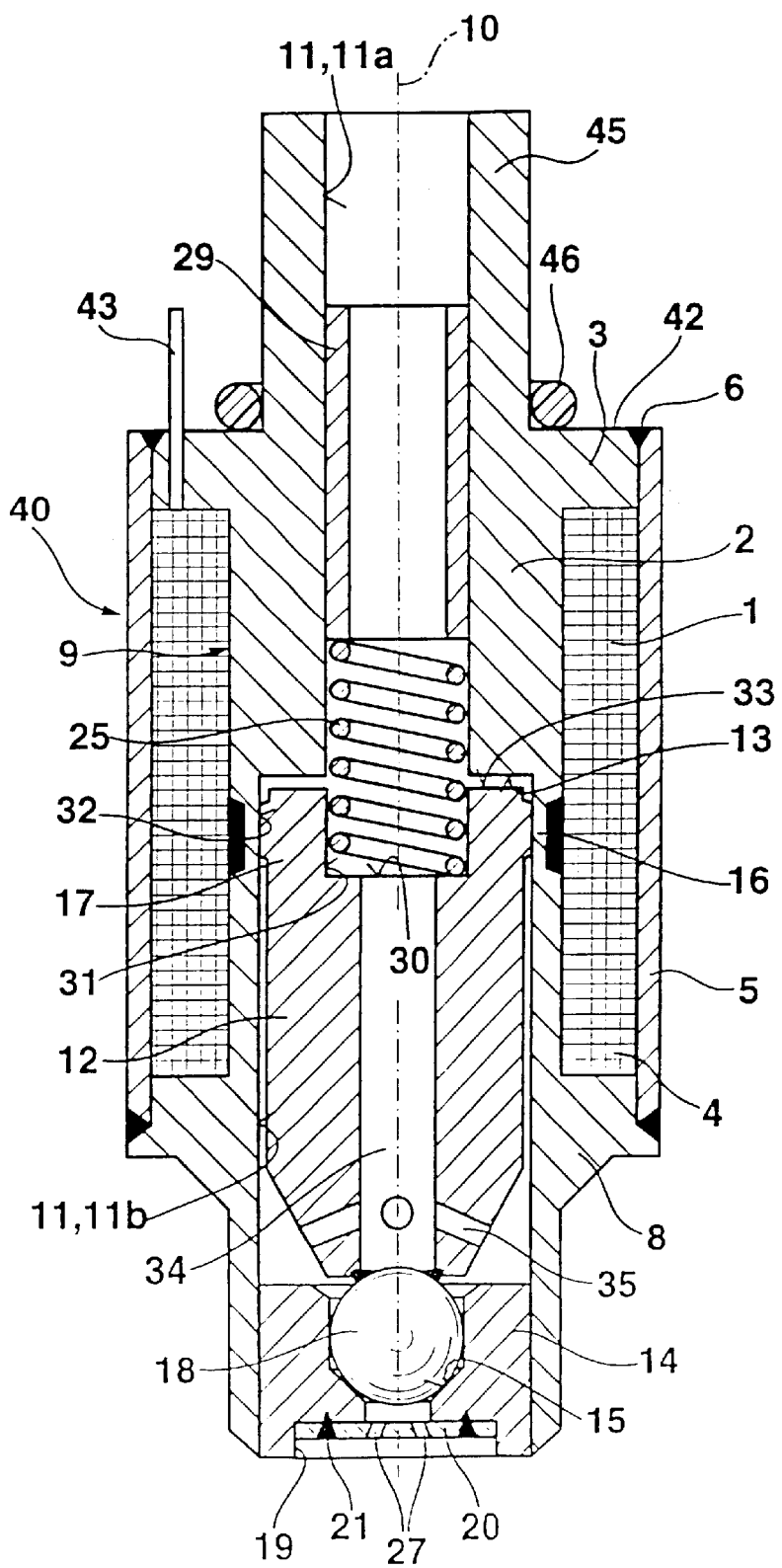
FIG. 1 shows a valve including a magnet coil arrangement manufactured according to the present invention.

The valve according to the present invention, or the valve manufactured according to the present invention, that is depicted in FIG. 1 in partially simplified form as an example, in the form of an electromagnetically actuatable injection valve for fuel injection systems of mixture-compressing, spark-ignited internal combustion engines, has a one-piece, largely tubular, metal base element 2 surrounded by a magnet coil 1, representing an inner valve tube, and serving as the internal pole of the magnetic circuit, as a fuel inlet and passthrough, and as a valve seat support. This valve is described as an example of magnetic valves which, in their most varied designs, can have magnet coils 1 according to the present invention. Base element 2 has multiple steps, and is stepped radially upstream from magnet coil 1, so that with a cover section 3 base element 2 partially radially envelops magnet coil 1, and allows a particularly compact configuration for the injection valve in the region of magnet coil 1. Magnet coil 1 is surrounded by an external sleeve-shaped, for example ferromagnetic valve shell 5 serving as external pole, which completely surrounds magnet coil 1 in the circumferential direction and at its upper end is joined immovably to base element 2 at its cover section 3, for example via a weld bead 6. To close the magnetic circuit, base element 2 is also of stepped configuration downstream from magnet coil 1, thus forming a guide section 8 which, like cover section 3, axially delimits magnet coil 1, guide section 8 constituting the delimitation of magnet coil 1 downward or in the downstream direction. Cover section 3, guide section 8, and the elongated inner part of base element 2 delimit an annular, chamber-like coil space 9 in which the actual winding 4 of magnet coil 1 is introduced. Valve shell 5 closes off coil space 9 externally.

Base element 2 possesses an internal longitudinal opening 11, running concentrically with a longitudinal valve axis 10, which serves in an upstream region 11a as a fuel flow conduit, and additionally in a downstream region 11b at least partially as a guide opening for a valve needle 12 that is axially movable along longitudinal valve axis 10. Region 11b has a greater diameter than region 11a, since a recessed step 13 is provided in longitudinal opening 11 in the axial extension region of magnet coil 1. Immediately downstream from recessed step 13, base element 2 possesses on the periphery a thin-walled magnetic throttling point 16 which is surrounded by magnet coil 1.

Downstream, for example, from guide section 8, base element 2 functions as a valve seat support, since a valve seat element 14, which has an immovable valve seat surface 15 constituting a valve seat, is introduced at the downstream end of region 11b of longitudinal opening 11. Valve seat element 14 is joined immovably to base element 2 using a weld bead generated, for example, with a laser. Lower region 11b of longitudinal opening 11 additionally serves to receive valve needle 12, which is constituted by an armature 17 and a spherical valve closure element 18. Arranged at the downstream end face of valve seat element 14, for example in a depression 19, is a flat perforated spray disk 20, the immovable join between valve seat element 14 and perforated spray disk 20 being achieved, for example, via a circumferential weld bead 21. At its downstream end facing perforated spray disk 20, armature 17 serving as the closure element support is immovably joined, for example via a weld bead, to the spherical valve closure element 18.

Actuation of the injection valve is accomplished, in a conventional manner, electromagnetically. The electromagnetic circuit, with magnet coil 1, inner base element 2, outer valve shell 5, and armature 17, serves to move valve needle 12 axially and thus to open the injection valve against the spring force of a return spring 25, or to close it. Armature 17 is correspondingly aligned on base element 2. Return spring 25 extends in longitudinal opening 11, for example, both downstream and upstream from recessed step 13, i.e. in both regions 11a and 11b.

The spherical valve closure element 18 coacts with valve seat surface 15 of valve seat element 14, that surface tapering frustoconically in the flow direction and being constituted in the axial direction downstream of a guide opening in valve seat element 14. Perforated spray disk 20 possesses at least one, for example four spray discharge openings 27 shaped by electrodischarge machining or punching.

The insertion depth of valve seat element 14 in the injection valve is one of the factors determining the stroke of valve needle 12. The one end position of valve needle 12, when magnet coil 1 is not energized, is defined by contact of valve closure element 18 against valve seat surface 15 of valve seat element 14, while the other end position of valve needle 12, when magnet coil 1 is energized, results from contact of armature 17 against recessed step 13 of base element 2. The stroke length is adjusted, for example, by axial displacement of valve seat element 14, which is then immovably joined to base element 2 in accordance with the desired position.

In addition to return spring 25, an adjusting sleeve 29 is slid into upper region 11a of longitudinal opening 11. Adjusting sleeve 29 is used to adjust the spring preload of return spring 25, which is in contact against adjusting sleeve 29 and at its opposite end braces against a bottom region 30 of an internal depression 31 in closure element support 17, an adjustment of the dynamic spray discharge volume also being accomplished with adjusting sleeve 29.

Armature 17 has, for example in the axial extension region of magnetic throttling point 16 on the outer circumference, an annular upper guide surface 32 which serves to guide the axially movable valve needle 12 in longitudinal opening 11. Armature 17 has an upper stop surface 33, facing recessed step 13, which is equipped with a wear-protection layer, e.g. is chrome-plated. Proceeding from bottom region 30 of depression 31, a through opening 34 which extends as far as valve closure element 18 is shaped in closure element support 17. In the vicinity of valve closure element 18, several branch openings 35 branch off from through opening 34 and extend to the external boundary of closure element support 17. This configuration of closure element support 17 makes it possible for the fuel being delivered to valve seat surface 15 to flow unimpeded through depression 31 and through opening 34 as well as branch openings 35. Branch openings 35 can be configured in any desired form (e.g. with circular, elliptical, or polygonal cross sections), and can extend radially or obliquely.

A valve having the design described above is characterized by its particularly compact configuration, resulting in a very small, manageable component whose valve shell 5 has, for example, an outside diameter of only approximately 11 to 14 mm. The components described so far constitute a preassembled independent assembly which can be referred to as functional part 40. The completely adjusted and assembled functional part 40 has, for example, an upper end surface 42 (in this case cover section 3) beyond which, for example, two contact pins 43 project. Using of electrical contact pins 43, which serve as electrical connecting elements, winding 4 of magnet coil 1 is electrically contacted and thus energized.

A functional part 40 of this kind can be joined to a connector part (not depicted) which is characterized above all in that it includes the electrical and hydraulic connections for the entire injection valve. A hydraulic connection of the connector part (not depicted) and functional part 40 is achieved, when the injection valve is completely assembled, in that flow bores of the two assemblies are brought toward one another in such a way as to ensure an unimpeded flow of fuel. End surface 42 of functional part 40 then rests, for example, directly against a lower end surface of the connector part, and is immovably joined thereto. During assembly of the connector part onto functional part 40, a base element fitting 45 of base element 2 projecting beyond end surface 42 and thus beyond cover section 3 can extend into a flow bore of the connector part in order to enhance connection stability. A sealing ring 46 which surrounds base element fitting 45 and rests on end surface 42 of cover section 3 is, for example, provided in the connecting region for reliable sealing. In the completely assembled valve, contact pins 43, serving as electrical connecting elements, enter into a secure electrical connection with corresponding electrical connecting elements of the connector part.

The subsequent Figures depict base element 2 completely or partially in the region of magnet coil 1 in order to illustrate the configuration according to the present invention of magnet coil 1. FIGS. 2a and 2b show base element 2 that is already known from FIG. 1, on the one hand before and on the other hand after the introduction of winding 4 of magnet coil 1. With the configuration of magnet coil 1 according to the present invention, winding 4 is executed not, as in the case of known valves, on a coil body which is assembled together with the wrapping as a prefabricated assembly, but rather on a winding support 50, already provided on base element 2 or on the internal pole or inner valve tube, which, for example, adhesively lines coil space 9 along the wall of base element 2 as a thin coating 50a. Thin layer 50a adheres to the surface of base element 2 and thereby also, for example, completely fills up an annular groove 51 of coil space 9 necessary to constitute magnetic throttling point 16. Thin coating 50a made of plastic provides electrical insulation of winding 4, subsequently to be introduced into coil space 9, with respect to base element 2. Coating 50a in coil space 9 is applied, for example, by vacuum evaporation, spraying, powder coating, painting, or other coating methods.

As FIG. 2b shows, winding 4 of magnet coil 1 is introduced only after winding support 50 has been mounted on base element 2. This is done by winding a coil wire onto the coated coil space 9; cover section 3 and guide section 8, which are also equipped with coating 50a, advantageously serve as winding delimiters which prevent axial spreading or drifting of winding 4.

Figure 3A:
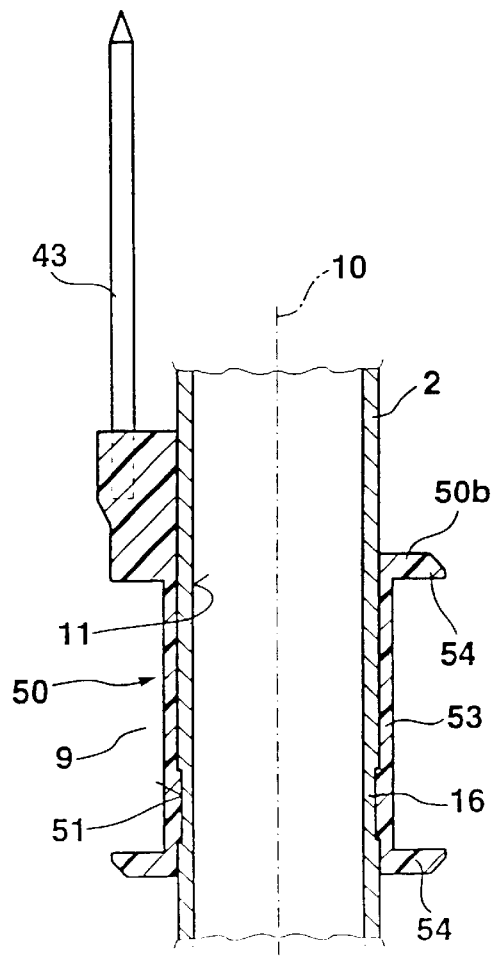
FIG. 3a shows a second example for mounting a magnet coil on an internal valve
Figure 3B:
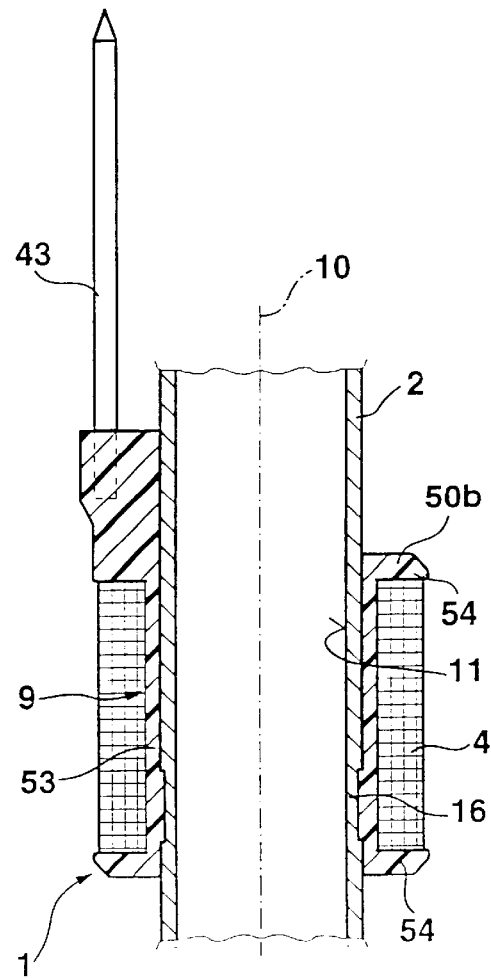
FIG. 3b shows a further view of the second example for mounting the magnet coil on the internal valve component.

FIGS. 3a and 3b depict a second exemplary embodiment in which an insulating winding support 50b is again applied in adhesively bonding fashion onto a base element 2 of the valve before the actual winding 4 of magnet coil 1 is introduced.

Stepped winding support 50b made of plastic is injection-molded directly onto the, for example, thin-walled tubular base element 2 (inner valve tube, internal pole) of the valve. Winding support 50b has a tubular support section 53 which conforms directly to the wall of base element 2. Two radially oriented collar sections 54, which extend out from support section 53 and are shaped in the same plastic injection-molding process as support section 53, serve as axial delimiters for the later winding 4. Magnetic throttling point 16 is also co-injected, since annular groove 51 on base element 2 is also filled up with plastic. The injection of plastic around the thin-walled throttling point 16 increases mechanical strength in this more-sensitive region. As FIG. 3a shows, contact pins 43 for electrical contacting of magnet coil 1 can be concurrently directly insert-molded into winding support 50b. Another approach (not depicted) provides for contact pins 43 not to be applied until later, along with winding 4. When winding 4 is introduced, contact must of course be made between the ends of the coil wire and contact pins 43.

According to FIG. 3b, winding 4 of magnet coil 1 is once again introduced into winding support 50b only after winding support 50b has been secured on base element. An assembly having a coil body and winding, which is mounted in complete fashion on base element 2, thus does not exist; instead, winding 4 is provided at a later time. Advantageously, direct injection application of winding support 50b or application of coating 50a economizes on installation space, since the radial wall thicknesses of winding support 50b can be reduced, or coatings 50a can be made very thin. Mounting of winding support 50b onto base element 2 with positive engagement is also conceivable.

What is claimed is:

1. A method for manufacturing a magnet coil for a valve, the method comprising the steps of:
   configuring an inner metal base element of the valve, the base element having an inner longitudinal opening, the base element being shaped as an annular coil space;
   mounting an electrically insulating winding support on an outer wall of the base element, the winding support including a thin adhesively bonding layer, by applying the bonding layer on a wall of the annular coil space;
   filling-up an annular groove with the bonding layer, the annular groove being provided out from a coil space to constitute a magnetic throttling point of the base element; and
   introducing a winding of the magnet coil into the winding support.

2. A method for manufacturing a magnet coil for a valve, he method comprising the steps of:
   configuring an inner metal base element of the valve, the base element having an inner longitudinal opening;
   mounting an electrically insulating winding support on an outer wall of the base element;
   injection-molding the winding support onto the outer wall of the base element, the winding support composed of a plastic material, the winding support including a tubular support section, two radially extending collar sections extending from the tubular support section and delimiting an annular coil space;
   filling up an annular groove with the plastic material of the winding support, the annular groove being situated on the base element to constitute a magnetic throttling point; and
   introducing a winding of the magnet coil into the winding support.

3. A method for manufacturing a magnet coil for a valve, the method comprising the steps of:
   configuring an inner metal base element of the valve, the base element having an inner longitudinal opening;
   mounting an electrically insulating winding support on an outer wall of the base element;
   injection-molding the winding support onto the outer wall of the base element, the winding support composed of a plastic material, the winding support including a tubular support section, two radially extending collar sections extending from the tubular support section and delimiting an annular coil space; and
   directly insert-molding contact pins into the winding support; and
   introducing a winding of the magnet coil into the winding support.

4. A valve, comprising:
   an inner metal base element having an inner longitudinal opening;
   a magnet coil surrounding the base element;
   an electrically insulating winding support mounted on the base element; and
   a winding wound onto the winding support after the winding support is mounted on the base element;
   wherein the base element is shaped as an annular coil space, the winding support including a thin adhesively bonding layer, the bonding layer applied on a wall of the annular coil space; and
   wherein an annular groove is provided out from a coil space to constitute a magnetic throttling point of the base element, the annular groove being filled-up with the bonding layer.

5. A valve comprising:
   an inner metal base element having an inner longitudinal opening;
   a magnet coil surrounding the base element;
   an electrically insulating winding support mounted on the base element; and
   a winding wound onto the winding support after the winding support has been mounted on the base element;
   wherein the winding support is injection-molded onto the outer wall of the base element, the winding support being composed of a plastic material, the winding support including a tubular support section, two radially extending collar sections extending from the tubular support section and delimiting an annular coil space.

6. The valve according to claim 4, wherein an annular groove is situated on the base element to constitute a magnetic throttling point, the annular groove being filled-up with the plastic material of the winding support.

7. The valve according to claim 5, further comprising:
   contact pins directly insert-molded into the winding support.

* * * * *

UNITED STATES PATENT AND TRADEMARK OFFICE
CERTIFICATE OF CORRECTION

PATENT NO. : 6,702,253 B2
DATED : March 9, 2004
INVENTOR(S) : Klaus Noller et al.

It is certified that error appears in the above-identified patent and that said Letters Patent is hereby corrected as shown below:

Column 1,
Line 13, change "4,610,080 has already disclosed" to -- 4,610,080 describes --

Column 4,
Line 5, change "Using of electrical" to -- Using electrical --

Signed and Sealed this

Twenty-eighth Day of June, 2005

JON W. DUDAS
*Director of the United States Patent and Trademark Office*